United States Patent [19]

Baskent et al.

[11] 4,379,757

[45] Apr. 12, 1983

[54] TERTIARY AMINE CATALYST MIXTURES USEFUL IN CELLULAR POLYURETHANE FORMATION

[75] Inventors: Feyyaz O. Baskent, Mahopac; Michael R. Sandner, Chappaqua, both of N.Y.

[73] Assignee: Union Carbide Corporation, Danbury, Conn.

[21] Appl. No.: 191,991

[22] Filed: Sep. 29, 1980

[51] Int. Cl.$^3$ .............................................. B01J 31/02
[52] U.S. Cl. ................................. 252/426; 521/118; 521/902; 521/904
[58] Field of Search ............... 252/426; 521/118, 902, 521/904

[56] References Cited

U.S. PATENT DOCUMENTS

| | | | |
|---|---|---|---|
| 3,010,963 | 11/1961 | Erner | 252/426 X |
| 3,726,816 | 4/1973 | Fabris et al. | 252/426 X |
| 3,892,687 | 7/1975 | Bechara et al. | 252/426 X |
| 3,988,267 | 10/1976 | Bechara et al. | 252/426 X |
| 3,993,652 | 11/1976 | Bechara et al. | 252/426 X |
| 4,011,223 | 3/1977 | Priest et al. | 260/268 R |
| 4,012,445 | 3/1977 | Priest et al. | 260/561 A |
| 4,049,931 | 9/1977 | Sandner et al. | 260/2.5 AC |
| 4,122,038 | 10/1978 | Sandner et al. | 252/431 C |

FOREIGN PATENT DOCUMENTS

| | | | |
|---|---|---|---|
| 2280649 | 4/1976 | France | 252/426 |
| 889048 | 2/1962 | United Kingdom | 252/426 |

*Primary Examiner*—Thomas A. Waltz
*Attorney, Agent, or Firm*—Paul W. Leuzzi, II

[57] ABSTRACT

Tertiary amine catalyst mixtures comprising at least one hydroxyalkyl piperazine, preferably 2-hydroxyethyl piperazine or 1,4-di-(2-hydroxyethyl) piperazine, and at least one other tertiary amine for increasing the processability of hydroxyalkyl piperazine in controlling the water-isocyanate reaction rate to obtain optimum performance in cellular polyurethane foam formulations and/or enhancing the compatibility of hydroxyalkyl piperazine with other foaming ingredients in flexible polyester polyurethane foam formulation; and a process for producing cellular polyurethanes, such as flexible polyester or polyether polyurethane foam and high resilience polyether polyurethane foam, by effecting the reaction of an organic polyol reactant and an organic polyisocyanate reactant in the presence of a blowing agent and said tertiary amine catalyst mixture, the resulting cellular polyurethanes exhibiting very low residual amine odor.

2 Claims, No Drawings

TERTIARY AMINE CATALYST MIXTURES USEFUL IN CELLULAR POLYURETHANE FORMATION

FIELD OF THE INVENTION

This invention relates to novel tertiary amine catalyst mixtures containing at least one hydroxyalkyl piperazine in the mixture and the use of said tertiary amine catalyst mixtures in the manufacture of cellular polyurethanes including flexible polyester or polyether polyurethane foam and high resilience polyether polyurethane foam.

BACKGROUND OF THE INVENTION

It is well known to the art that cellular polyurethanes are provided by the reaction of organic polyisocyanates and active hydrogen-containing organic compounds such as in particular organic polyols, in the presence of a source of blowing agent and one or more catalysts. It is also known that a number of different chemical reactions occur during polymer formation and expansion. For example, in addition to the chain-extending, urethane-forming reaction between free isocyanate groups and active hydrogen, initially formed urethane linkages bearing secondary hydrogen may also function as a source of active hydrogen and react with additional isocyanate to form cross-links between polymer chains. Further, in systems wherein the blowing agent comprises water such as, for example, flexible and high resilience foam formulations, isocyanate is also consumed by reaction with water, thereby generating carbon dioxide blowing agent in situ, and inroducing further cross-links comprising urea groups. The nature of the cellular structure and the physical and mechanical properties of the foam are influenced by the extent of such reactions, and the relative rates and point in time at which they occur. Although balancing these variables so as to achieve a particular type or grade of foam can be controlled to some extent by the functionality, molecular weight and other structural features of the polyisocyanate and active hydrogen-containing reactants, the catalyst system also plays a significant role in this respect.

Among the types of compounds that have achieved long-standing widespread commercial application as catalysts in polyurethane foam manufacture are: tertiary amines consisting of carbon, hydrogen and amino nitrogen, as typically illustrated by 1,4-diazobicyclo[2.2.2]octane ("triethylenediamine"), N,N,N',N'-tetramethyl-1,3-butanediamine and N,N-dimethylcyclohexylamine; tertiary amines consisting of carbon, hydrogen, amino nitrogen and oxygen wherein oxygen is present as ether oxygen, as typically illustrated by bis[2-(N,N-dimethylamino)ethyl]ether and N-ethylmorpholine, and tertiary amines consisting of carbon, hydrogen, amino nitrogen and oxygen wherein oxygen is present as hydroxyl as typically illustrated by N,N-dimethylethanolamine. With particular reference to the manufacture of flexible polyether polyurethane foams, such teritary amines are usually employed in combination with auxiliary catalysts comprising organic derivatives of tin such as stannous octoate and dibutyltin dilaurate in order to provide a synergistic activation of the chain-extending reaction.

A relatively recent advance in the area of cellular polyurethane technology which has triggered research effort to develop improved catalyst systems, is the advent of relatively complex multi-variable industrial scale machines for formulating polyurethane foams. Improved catalyst systems having wide processing latitude (i.e., a catalyst system which, when employed in various concentration amounts of wide latitude, produces polyurethane foams having desirable physical properties including good formulation reactivity as reflected by the rise time) are necessary in industrial scale machine formulations to produce commercially desirable polyurethane foams which require specific shapes, sizes and other physical properties (e.g., flexible, high resilience, etc.). The single commercial tertiary amine catalysts described above usually afford optimum performance at only a very narrow concentration range. Any deviation from this narrow concentration range may result in poor formulation reactivity or physical abnormalities in the polyurethane foams. The lack of discovery of a proper catalyst system having wide processing latitude in controlling the water-isocyanate reaction rate to obtain optimum formulation performance in relatively complex multi-variable industrial scale machines has been a problem in the art. In the production of at least a substantial proportion of polyurethane foams being manufactured at the present time, the aforementioned N-ethylmorpholine is used as a major component of the catalyst system.

With respect to polyurethane foam manufacture generally, it is often the preferred practice of foam manufacturers to premix the amine catalyst(s), water and foam stabilizer and to feed the aqueous premixture, commonly referred to as the activator stream, to the foam formulation as a single stream. It is often observed, however, that the mere mixing of the amine catalyst and foam stabilizer in water forms a highly viscous mixture which detracts from the processing advantage of adding these components as a combined stream rather than as individual streams. This problem is encountered in particular in the manufacture of flexible polyester polyurethane foam in which silicon-free organic surfactants are used to stabilize the foam. Thus, when certain otherwise catalytically effective amine catalysts such as bis[2-(N,N-dimethylamino)ethyl]ether, are present in combination with organic foam stabilizers, the activator stream becomes extremely viscous, approaching or actually undergoing gellation, thereby hampering or preventing pumping. In this respect, N-ethylmorpholine is used with advantage in the manufacture of flexible polyester polyurethane foam in that it is suitably employed as an amine catalyst in aqueous activator streams containing silicon-free or silicon-containing organic foam stabilizers.

The usefulness of N-ethylmorpholine in the manufacture of cellular polyurethanes, however, is attended with certain disadvantages. Thus, N-ethylmorpholine suffers the very serious drawback of having a particularly strong amine odor. The large quantities of N-ethylmorpholine which are employed relative to other catalyst components of the foam formulation causes an obnoxious atmosphere at and surrounding the foam manufacturing plant site and also provides foams having a strong residual amine odor. This compound is also associated with a number of serious toxic effects; see, for example, Plastic Technology, "Catalysts Improve As Their Need Increases" pages 47–49 (July 1972).

With a view toward providing a replacement for N-ethylmorpholine in the production of cellular polyurethanes and thereby allowing for at least a substantial reduction in the relatively large amounts presently employed, several patents have disclosed tertiary amine catalyst mixtures containing no N-ethylmorpholine and the use of said mixtures in cellular polyurethane manufacture. U.S. Pat. No. 4,012,445, U.S. Pat. No. 4,011,223, U.S. Pat. No. 3,954,749 and U.S. Pat. No. 3,821,131 relate to particular mixtures of beta-amino carbonyl catalysts wherein carbonyl is present as an amido or carboxylic acid ester group and the beta-amino group is present as dialkylamino or an N-morpholino or an N,N'-piperazino heterocyclic nucleus, and to the use of such mixtures as catalytic components in cellular polyurethane formulation. U.S. Pat. No. 4,122,038 describes and claims a catalyst combination for cellular urethane formation consisting of at least one dimethylamino ether mono-ol and at least one other tertiary amine selected from the following: bis[2-(N,N-dimethylamino)ethyl]ether, 3-dimethylamino-N,N-dimethylpropionamide, 3-dimethyl-aminopropionitrile, triethylenediamine, N,N,N',N'-tetramethyl-1,3-butanediamine and N,N-dimethylethanolamine. U.S. Pat. No. 4,049,931 discloses the uses of a catalyst system comprising a tertiary-dimethylamino ether mono-ol, including mixtures thereof, in the production of cellular urethane polymers. U.S. Pat. No. 3,925,268 relates to the use of a particular catalyst mixture comprising beta-amino nitrile catalysts with other tertiary-amines such as, for example, 3-(N,N-dimethylamino)propionitrile with dimethylethanolamine or a bis[2-(N,N-dimethylamino)alkyl]ether, in the production of cellular urethane polymers. U.S. Pat. No. 4,038,210 discloses and claims a catalyst combination for cellular urethane formation consisting of 3-(N,N-dimethylamino)propionitrile and at least one of dimethylethanolamine and bis[2-(N,N-dimethylamino)ethyl]ether. U.S. Pat. No. 4,115,321 describes and claims a catalyst combination for cellular urethane formation consisting of at least one dimethylamino ether propionitrile and at least one other tertiary amine selected from the following: bis[2, (N,N-dimethylamino)ethyl]ether, 3-dimethylamino-N,N-dimethylpropionamide, N,N-dimethylcyclohexylamine and triethylenediamine. However, none of the above-mentioned patents disclose the novel tertiary amine catalyst mixtures of this invention or their use in the manufacture of cellular polyurethanes.

It is desirable, therefore, and is a primary object of this invention, to provide tertiary amine catalyst mixtures containing at least one hydroxyalkyl piperazine in the mixture as a direct replacement for N-ethylmorpholine in the production of cellular polyurethanes and thereby allow for at least a substantial reduction in the relatively large amounts presently employed.

A further object is to provide a process for manufacturing cellular polyurethanes utilizing tertiary amine catalyst mixtures containing at least one hydroxyalkyl piperazine in the mixture as a catalytic component in the polyurethane-forming reaction, thereby, imparting good formulation reactivity to the polyurethane-forming reaction.

Yet another object is to provide cellular polyurethanes, including flexible polyester polyurethane foam, flexible polyether polyurethane foam and high resilience polyether polyurethane foam, having desirable physical properties including good breathability or porosity.

Various other objects and advantages of this invention will become apparent to those skilled in the art from the accompanying description and disclosure.

SUMMARY OF THE INVENTION

In accordance with the teachings of the present invention, in part, tertiary amine catalysts mixtures are provided for effecting the reaction of active hydrogen-containing compounds and polyisocyanates in the presence of a blowing agent. The structural characteristic common to each of the tertiary amine catalyst mixtures of this invention is the presence of a hydroxyalkyl piperazine. More specifically the tertiary amine catalyst mixtures of this invention comprise: (1) from about 5 to about 95 percent by weight of at least one hydroxyalkyl piperazine having the formula,

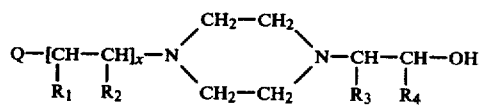

where x has a value of 0 or 1 with the proviso that x is 0 only when Q is hydrogen, Q represents a hydrogen or hydroxyl group, and $R_1$, $R_2$, $R_3$ and $R_4$ each represent hydrogen or an alkyl group having from 1 to 4 carbon atoms and may be the same as or different from one another; and (2) from about 95 to about 5 percent by weight of at least one other tertiary amine selected from the group consisting of: (a) a tertiary amine for increasing the processability of piperazine component (1) in controlling the water-isocyanate reaction rate to obtain optimum performance in cellular polyurethane foam formulations in which the resulting cellular polyurethane foams exhibit very low residual amine odor; and (b) a tertiary amine for enhancing the compatibility of piperazine component (1) with other foaming ingredients in flexible polyester polyurethane foam formulations in which the resulting flexible polyester polyurethane foams exhibit very low residual amine odor; said weight percentages being based on the combined total weight of components (1) and (2). It is to be understood that alkyl groups having from 1 to 4 carbon atoms may be both linear and branched radicals.

It has been discovered that the above-described tertiary amine catalyst mixtures are useful as catalytic components in the manufacture of a wide variety of cellular polyurethanes including flexible polyester polyurethane foam, flexible polyether polyurethane foam and high resilience polyether polyurethane foam. More specifically the instant invention is directed, in part, to a process for preparing cellular polyurethanes which comprises reacting and foaming a reaction mixture containing: (1) an organic polyol reactant having an average hydroxyl functionality of at least two; (2) an organic polyisocyanate reactant having an average isocyanato functionality of at least two, said organic polyol and said organic polyisocyanate being present in the mixture in a major amount and in the relative amounts required to produce the cellular polyurethanes; (3) a blowing agent in a minor amount sufficient to foam the reaction mixture; and (4) a catalytically effective amount of a tertiary amine catalyst mixture of the present invention. In the preparation of flexible polyester polyurethane foam, flexible polyether polyurethane foam and high resilience polyether polyurethane foam, additional catalysts and a foam stabilizing surfactant may also be used as essential ingredients in each specific foam-producing reaction mixture.

The tertiary amine catalyst mixtures of this invention are effective when used as the sole catalytic component of the foam formulations, although their employment in addition to other co-catalysts (e.g., amine co-catalysts, metal co-catalysts, etc.) is within the scope of this invention. Effective in catalyzing the water-isocyanate reaction, these tertiary amine catalyst mixtures are used with particular advantage in the manufacture of water-blown flexible polyurethane foams and high resilience polyurethane foams, both molded and free-rise. It has also been discovered that, in addition to their usefulness as catalytic components of foam formulations containing silicone foam stabilizing surfactants, the tertiary amine catalyst mixtures of this invention offer the further advantage of providing liquid, easily pumped activator streams containing silicon-free organic foam stabilizing surfactants of flexible polyester polyurethane foam formulations. In addition to their versatility in the aforesaid respects, the tertiary amine catalyst mixtures of the instant invention have the further highly desirable characteristics of wide processing latitude and low residual amine odor, thus allowing for the formation of foam products essentially free of the post-cure amine odor associated with N-ethylmorpholine.

DESCRIPTION OF THE INVENTION

The tertiary amine catalyst mixtures of this invention contain, as an essential component, at least one hydroxyalkyl piperazine having the formula,

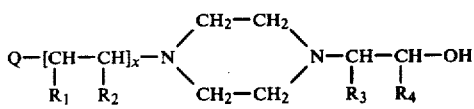

where x has a value of 0 or 1 with the proviso that x is 0 only when Q is hydrogen, Q represents a hydrogen or hydroxyl group, and $R_1$, $R_2$, $R_3$ and $R_4$ each represent hydrogen or an alkyl group having from 1 to 4 carbon atoms and may be the same as or different from one another. The generally preferred hydroxyalkyl piperazines are those compounds wherein x has a value of 0 or 1, Q represents a hydrogen or hydroxyl group, and $R_1$, $R_2$, $R_3$ and $R_4$ each represent hydrogen. Most preferred is the hydroxyalkyl piperazine encompassed by the formula when x has a value 0, Q represents hydrogen, and $R_3$ and $R_4$ each represent hydrogen. Typical examples of preferred hydroxyalkyl piperazines suitable as components in the tertiary amine catalyst mixtures of the present invention include the following compounds:
2-hydroxyethyl piperazine 1,4-di-(2-hydroxyethyl)piperazine The tertiary amine catalyst mixtures of this invention also contain, as an essential component, at least one other tertiary amine selected from the following: (a) a tertiary amine for increasing the processability of the hydroxyalkyl piperazine component in controlling the water-isocyanate reaction rate to obtain optimum performance in cellular polyurethane foam formulations in which the resulting cellular polyurethane foams exhibit very low residual amine odor; and/or (b) a tertiary amine for enhancing the compatibility of the hydroxyalkyl piperazine with other foaming ingredients in flexible polyester polyurethane foam formulations in which the resulting flexible polyester polyurethane foams exhibit very low residual amine odor. Typical examples of generally preferred tertiary amines suitable as components in the tertiary amine catalyst mixtures of this invention include the following compounds:
2-(2-dimethylaminoethoxy)ethanol
bis[2-(N,N-dimethylamino)ethyl]ether
N,N-dimethylethanolamine
3-dimethylamino-N,N-dimethylpropionamide
N-ethylmorpholine
1,4-diazobicyclo[2.2.2]octane ("triethylenediamine")
2-(2-N-methyl-N-2-hydroxyethylaminoethoxy)ethanol
2-(2-diethylaminoethoxy)ethanol
2-[2-(4-morpholino)ethoxy]ethanol
1-(2-dimethylaminoethoxy)-2-propanol
1-(2-diethylaminoethoxy)-2-propanol
1-[2-(4-morpholino)ethoxy)-2-propanol
1-(1-dimethylamino-2-propoxy)-2-propanol
2-(1-(diethylamino-2-propoxy)-2-propanol
2-(1-dimethylamino-2-propoxy)ethanol
2-(1-diethylamino-2-propoxy)ethanol
3-(2-dimethylaminoethoxy)propionitrile
3-(2-diethylaminoethoxy)propionitrile
3-[2-(2-dimethylaminoethoxy)ethoxy]propionitrile
3-[2-(2-diethylaminoethoxy)ethoxy]propionitrile
3-[2-(4-morpholino)ethoxy]propionitrile
3-[2-(4-morpholinoethoxy)ethoxy]propionitrile
3-(2-dimethylaminoethoxy)-2-methylpropionitrile
3-(1-dimethylamino-2-propoxy)propionitrile
3-(1-diethylamino-2-propoxy)propionitrile
3-[1-(4-morpholino)-2-propoxy]propionitrile
3-(2-dimethylaminoethoxy)butyronitrile Most preferred of the tertiary amines suitable as components in the teritary amine catalyst mixtures of this invention are the following compounds:
2-(2-dimethylaminoethoxy)ethanol
bis[2-(N,N-dimethylamino)ethyl]ether
N,N-dimethylethanolamine
3-dimethylamino-N,N-dimethylpropionamide
N-ethylmorpholine
1,4-diazobicyclo[2.2.2]octane ("triethylenediamine")

The novel tertiary amine catalyst mixtures of the present invention can be prepared by several methods which are known in the art (e.g., by mixing certain tertiary amines). The tertiary amine components (i.e., at least one hydroxyalkyl piperazine and at least one other tertiary amine) used to produce the novel tertiary amine catalyst mixtures of this invention are known materials made by known methods.

The tertiary amine components are mixed in specifically defined weight ratios to produce the novel tertiary amine catalyst mixtures of this invention. The preferred hydroxyalkyl piperazines suitable as components in the tertiary amine catalyst mixtures of this invention comprise from about 5 to about 95 percent by weight of the total tertiary amine catalyst mixture. The weight percentages described herein are based on the combined total weight of the tertiary amine catalyst mixtures. 2-Hydroxyethyl piperazine is preferably present in the tertiary amine catalyst mixtures in an amount of from 5 to 95 percent by weight, most preferably in an amount of from 7.5 to 90 percent by weight. When employed in combination with 2-hydroxyethyl piperazine, 1,4-di-(2-hydroxyethyl)piperazine is preferably present in the tertiary amine catalyst mixtures in an amount of from 5 to 25 percent by weight, most preferably in an amount of from 7.5 to 15 percent by weight. The other preferred tertiary amines suitable as components in the tertiary amine catalyst mixtures of this invention comprise from about 95 to about 5 percent by weight of the total tertiary amine catalyst mixture. 2-(2-Dimethylaminoethoxy)ethanol is preferably present in the tertiary amine catalyst mixtures in an amount of from 40 to 80 percent by weight, most preferably in an amount of from 55 to 65 percent by weight. Bis[2-(N,N-dimethylamino)ethyl]ether is preferably present in the tertiary amine catalyst mixtures in an amount of from 5 to 95 percent by weight, most preferably in an amount of from 10 to 90 percent by weight. N,N-Dimethylethanolamine is preferably present in the tertiary amine catalyst mixtures in an amount of from 30 to 90 percent by weight, most preferably in an amount of from 50 to 80 percent by weight. 3-Dimethylamino-N,N-dimethylpropionamide is preferably present in the tertiary amine catalyst mixtures in an amount of from 10 to 90 percent by weight, most preferably in an amount of from 20 to 75 percent by weight. N-Ethylmorpholine is preferably present in the tertiary amine catalyst mixtures in an amount of from 50 to 90 percent by weight, most preferably in an amount of from 70 to 75 percent by weight. 1,4-Diazobicyclo[2.2.2]octane is preferably present in the tertiary amine catalyst mixtures in an amount of from 5 to 95 percent by weight, most preferably in an amount of from 10 to 85 percent by weight.

The tertiary amine catalyst mixtures of this invention are employed in the formulation of cellular polyurethanes in a catalytically effective amount. Thus, the concentration thereof may vary over a relatively wide range such as from about 0.01 to about 10 or more parts by weight (exclusive of any carrier solvents or other additives) per 100 parts by weight of total polyol reactant (p.p.h.p.) contained in the reaction mixture. Preferably, the tertiary amine catalyst mixtures of this invention are present in an amount from about 0.05, most preferably from about 0.1, to about 6 p.p.h.p. In flexible and high resilience polyurethane foam formulations, it is usually adequate to employ the tertiary amine catalyst mixtures in an amount up to about three p.p.h.p.

The tertiary amine catalyst mixtures of this invention may be employed as the sole catalytic component of the foam formulations described herein or they may be employed in mixture with one or more other co-catalysts including amine co-catalysts and metal co-catalysts. The amine co-catalysts can contain up to 24 carbon atoms and usually have no more than 12 carbon atoms. Among the suitable classes of such additional amine co-catalysts are amines consisting of carbon, hydrogen and amino nitrogen, as well as amines consisting of these three elements and oxygen wherein oxygen is present as an ether or hydroxyl group. Illustrative of such amine co-catalysts for use in addition to the tertiary amine catalyst mixtures of this invention are: trimethylamine; triethylamine; tributylamine; N,N,N',N'-tetramethylethylenediamine; N,N,N',N'-tetramethyl-1,3-butanediamine; N,N-dimethylcyclohexylamine; N,N-dimethylbenzylamine; bis[2-(N,N-dimethylamino)alkyl]ethers such as bis[2-(N,N-dimethylamino)ethyl]ether; triethylenediamine; N-methylmorpholine; N-ethylmorpholine; N-methyldiethanolamine; N,N-dimethylethanolamine; 3-dimethylamino-N,N-dimethylpropionamide; and other such amine co-catalysts known to the art. N-Ethylmorpholine is presently used in commercial practice in realtively high concentrations (up to about 25 p.p.h.p.) as a catalytic component of molded high resilience polyurethane foam formulations in order to provide foams having good mold-release characteristics. In view of the present discovery that such foams can be produced by employing the tertiary amine catalyst mixtures of the instant invention without the necessity of using N-ethylmorpholine, the latter catalyst may be completely eliminated, thereby reducing the obnoxious residual foam odor associated therewith. It is to be understood, however, that N-ethylmorpholine may be used as a component of the tertiary amine catalyst mixtures described herein without departing from the scope of this invention. When used, the aforementioned supplementary amine co-catalysts may be present in the foam formulation in an amount within the aforesaid ranges defined with respect to the tertiary amine catalyst mixtures of this invention. It is to be understood that the tertiary amine catalyst mixtures of the present invention and the supplementary amine co-catalysts, when used, may be added to the formulation as separate streams or in pre-blended form.

Other amine co-catalysts are also often employed as components of cellular polyurethane foam formulations in order to avoid foam splitting by providing a tighter foam, highly porous foams having a greater tendency to develop splits. Suitable co-catalysts for this purpose are hexadecyldimethylamine, dicyclohexylmethylamine, pentamethyldiethylenetriamine and N,N-dimethylbenzylamine. When used, such amine co-catalysts are present in the cellular polyurethane foam formulations in an amount from about 0.1 up to about one p.p.h.p.; usually no more than about 0.6 p.p.h.p. is used.

In producing flexible polyether polyurethane foams and high resilience polyether polyurethane foams, it is often desirable to include as a further component of the foam formulation a minor amount of certain metal co-catalysts, particularly organic derivatives of tin including stannous and stannic compounds. Such metal co-catalysts are well known to the art. Illustrative of suitable organic tin compounds are the following, which may be employed individually or in combination, stannous salts of carboxylic acids such as stannous octoate, stannous oleate, stannous acetate and stannous laurate; dialkyltin dicarboxylates such as dibutyltin dilaurate, dibutyltin diacetate, dilauryltin diacetate, dibutyltin di(2-ethylhexanoate) and other such tin salts as well as dialkyltin oxides, trialkyltin oxides, tin mercaptides such as, for example, di-n-octyl tin mercaptide, and the like. When used, the amount of such metal co-catalysts ranges from about 0.001 to about 2 parts by weight per 100 parts by weight of total polyol reactant. The metal co-catalyst is preferably used in an amount from about 0.01 to about 0.6 p.p.h.p., and most preferably in an amount no more than about 0.5 p.p.h.p.

It is to be understood that the tertiary amine catalyst mixtures of this invention, as well as the supplementary amine co-catalysts and metal co-catalysts, may be introduced to the foam formulations in undiluted form or as solutions in suitable carrier solvents such as diethylene glycol, dipropylene glycol and hexylene glycol. Other useful carrier solvents are lower alkylene oxide adducts of monohydric or polyhydric starters such as butanol, dipropylene glycol and glycerol. Such solvents (or diluents) generally include adducts containing from about 3 to about 30 oxyethylene or oxypropylene units, mixtures of such adducts, as well as adducts provided by reaction of the starter with ethylene oxide and propylene oxide, fed either as a mixed feed or sequentially. Among the suitable organic carrier solvents of this type are the ethylene oxide-propylene oxide adducts of butanol having the average formula, $C_4H_9(OC_3H_6)_u(OC_2H_4)_sOH$, wherein s and u may each have an average value from about 3 to about 30. Preferably, the values of s and u are such that the average molecular weight of these fuids is not substantially greater than about 2000 and the oxyethylene content is from about 20 to about 80 weight percent, based on total polyoxyalkylene content. Usually, the weight percent of oxyethylene is about the same as the weight percent of oxypropylene.

The tertiary amine catalyst mixtures of the present invention, as well as the supplementary amine co-catalysts, may also be introduced to the foam formulations in combination with water soluble, nonionic surfactants of the class such as the (1) polyoxyalkylene ethers of higher alcohols having from 10 to 18 carbon atoms including mixtures thereof; and the (2) polyoxyalkylene ethers of alkylsubstituted phenols in which the alkyl group can have from 6 to 15 carbon atoms. The length of the ether chain is such that appropriate hydrophilic character is provided to balance the hydrophobic portion derived from the alcohol or phenol and render the compound miscible with water. The chain may contain oxyethylene units either as essentially the sole type of unit or oxyethylene in combination with a minor amount of oxypropylene. It is preferred that the hydrophilic portion of such nonionic organic surfactants be composed essentially of oxyethylene monomeric units. Usually the average number of such $-OC_2H_4-$ units ranges from about 4 to about 20, although upwards of 30 such units can also be present. Typical examples of nonionic surfactants include the adducts produced by reaction of from about 4 to about 30 moles of ethylene oxide per mole of any of the following hydrophobes, including mixtures thereof, n-undecyl alcohol, myristyl alcohol, lauryl alcohol, trimethyl nonanol, tri-decyl alcohol, pentadecyl alcohol, cetyl alcohol, oleyl alcohol, stearyl alcohol, nonylphenol, dedecylphenol, tetradecylphenol, and the like. Especially suitable are the ethylene oxide adducts of nonylphenol having the average composition, $C_9H_{19}$-$C_6H_4$-$(OC_2H_4)_h$-OH, wherein h has an average value from about 4 to about 20, inclusive of the whole and fractional numbers, such as 6, 9, 10.5 and 15.

The above-described solution compositions may contain from about 10 to about 90 percent by weight of total catalyst component, based on the combined weight of catalyst, solvent and/or nonionic surfactant, depending upon whether the catalyst component is employed in combination with either one or both of the solvent and nonionic surfactants.

It is well known to the cellular polyurethane art that the particular polyol reactant or combination of polyols employed in any given formulation depends in large measure upon the end-use application of the cellular product, and that the end-use in turn determines whether the product is to be provided as a flexible, high resilience or other type of foam as well as a polyether or a polyester foam. Accordingly, different polyhydroxyl reactants (organic polyols) were employed in this invention as the starting materials to prepare flexible polyester polyurethane foam, flexible polyether polyurethane foam and high resilience polyurethane foam as described in the working Examples hereinbelow. Any of the polyols known to be useful to those of ordinary skill in the art can be used with the novel tertiary amine catalyst mixtures of this invention.

The organic polyols (polyester polyols) employed in producing flexible polyester polyurethane foam in accordance with the process of this invention are well known and include the reaction products of polyfunctional organic carboxylic acids and polyhydric alcohols. The polyester polyols contain at least two hydroxyl groups per molecule (as alcoholic OH or as OH in COOH groups). The functionality of these polyols is preferably provided by alcoholic hydroxyl groups; however, also useful are compounds having carboxy groups (COOH) or both carboxy groups and alcoholic hydroxyl groups. The polyesters can have hydroxyl numbers from about 30 to about 150, and preferably have hydroxyl numbers between about 45 and about 65. As is well known to this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxy number is also defined by the following equation which indicates its relationship with the molecular weight and functionality of the polyol:

$$OH = (56.1 \times 1000 \times f/M.W.)$$

wherein
OH = hydroxyl number of the polyol,
f = average functionality, that is, the average number of hydroxyl groups per molecule of polyol, and
M.W. = average molecular weight of the polyol.

The polyester polyols useful for producing foams with the tertiary amine catalyst mixtures and the novel process of this invention are well known to those skilled in the art and many are commercially available. They are so well known that an extensive description thereof in this application is not required to enable the average practitioner to know what they are. Nevertheless, the following brief description is presented.

The polyester polyols are produced by the reaction of a polycarboxylic acid or anhydride (preferably dicarboxylic acid) with a polyhydroxyl compound (preferably dihydroxyl), or the reaction of a hydroxyl monocarboxylic acid, by conventional polyesterification processes well known in the art.

Typical of the polyfunctional organic carboxylic acids that are used in producing polyester polyols are the dicarbolxylic aliphatic acids such as succinic, adipic, sebacic, azelaic, glutaric, pimelic, malonic and suberic acids, the dicarboxylic aromatic acids such as phthalic acid, terephthalic acid, isophthalic acid and the like, the "dimer acids" such as the dimer of linoleic acid, and the hydroxyl-containing monocarboxylic acids (such as ricinoleic acid). Alternatively, the anhydrides of any of these various acids can be employed in producing the polyester polyols.

The polyhydric alcohols (organic polyols) that are reacted with the carboxylic acids in producing the polyester polyols include the monomeric polyhydric alcohols such as, for example, glycerol; 1,2,6-hexanetriol; ethylene glycol; diethylene glycol; timethylolpropane; trimethylolethane; pentaerythritol; propylene glycol; 1,2-, 1,3- and 1,4-butylene glycols; 1,5-pentanediol; sorbitol; and the like, including mixtures thereof.

Other polyhydric alcohols that can be employed in producing the polyester polyols useful in preparing the foams of this invention are the polymeric polyhydric alcohols which include the linear and branched chain polyethers having a plurality of acyclic ether oxygens and at least two free alcoholic hydroxyl groups. Illustrative of such polyether polyols are the heteric, blocked or capped poly(oxyalkylene)polyols containing one or more chains of connected oxyalkylene radicals which are prepared by the reaction of one or more alkylene oxides with acyclic and alicyclic polyols. Examples of the poly(oxyalkylene)polyols include the poly(oxyethylene)glycols prepared by the addition of ethylene oxide to water, ethylene glycol or diethylene glycol; poly(oxypropylene)glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the poly(oxybutylene)glycols and copolymers such as poly(oxyethylene-oxybutylene)glycols and poly(oxypropylene-oxybutylene)glycols. Included in the term "poly(oxybutylene)glycols" are polymers of 1,2-butyleneoxide and 2,3-butyleneoxide.

Illustrative of further polyester polyol reactants that are useful in producing flexible polyester urethane foam in accordance with the process of this invention are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane; 1,2,6-hexanetriol; pentaerythritol; sorbitol; glycosides such as methyl, ethyl, propyl, butyl and 2-ethylhexyl arabinoside, xyloside, fructoside, glucoside, and rhammoside; sucrose; mononuclear polyhydroxybenzenes such as resorcinol, pyrogallol, phloroglucinol, hydroquinone, 4,6-ditertiarybutylcatechol, and catechol; polynuclear hydroxybenzenes ("polynuclear" designating at least two benzene nuclei) such as the di-, tri- and tetraphenylol compounds in which two to four hydroxybenzene groups are attached either directly by means of single bonds or through an aliphatic hydrocarbon radical containing one to twelve carbon atoms, such compounds being typically illustrated by 2,2-bis(p-hydroxyphenyl)-propane, bis(p-hydroxyphenol)-methane and the various dephenols and diphenol methanes disclosed in U.S. Pat. Nos. 2,506,486 and 2,744,882, respectively. Another type of polyester polyol reactant is that produced by reaction of a polycarboxylic acid and the polyether adducts formed by reaction of ethylene oxide, propylene oxide or butylene oxide with phenol-formaldehyde condensation products such as the novolaks. Also useful are the well known polylactone polyester polyols many of which are commercially available and, therefore, require no detailed description herein.

The organic polyols (polyether polyols) employed in producing flexible polyether polyurethane foam in accordance with the process of this invention include linear and branched polyethers having an average functionality from two to eight. For convenience, this class of polyether polyols are referred to herein as Polyol I. These polyols include alkylene oxide adducts of water such as polyethylene glycols having average molecular weights from about 200 to about 600, polypropylene glycols having average molecular weights from about 400 to about 2000, and polyoxyalkylene polyols having a combination of different alkylene oxide units. Other suitable polyols encompassed within the definition of Polyol I are the alkylene oxide adducts of polyhydric organic initiators, the nature of which determines the average hydroxyl functionality of the polyoxyalkylated product. Illustrative of suitable polyhydric organic initiators are the following, which can be employed individually or in combination with one another, (1) diols such as ethylene glycol, diethylene glycol, propylene glycol, 1,5-pentanediol, hexylene glycol, dipropylene glycol, trimethylene glycol, 1,2-cyclohexanediol, 3-cyclohexene-1,1-dimethanol and 3,4-dibromocyclohexane-1,1-dimethanol; (2) triols such as glycerol, 1,2,6-hexanetriol,1,1,1-trimethylolpropane, 3-(2-hydroxyethoxy)- and 3-(2-hydroxypropoxy)-1,2-propanediols, 2,4-dimethyl-2-(2-hydroxyethoxy)methyl-pentanediol-1,5;1,1,1-tris[2-hydroxyethoxy)-methyl]ethane and 1,1,1-tris[(2-hydroxypropoxy)methyl]propane; (3) tetrols such as pentaerythritol; (4) pentols, hexols, heptanols and octanols such as glucose, sorbitol, bis(2,2,2-trimethylolethyl) ether, alpha-methyl glucoside, sucrose, mannose and galactose; (5) compounds in which hydroxyl groups are bonded to an aromatic nucleus such as resorcinol, pyrogallol, phloroglucinol, di-, tri- and tetraphenylol compounds such as bis(p-hydroxyphenyl)methane and 2,2bis(p-hydroxyphenyl)propane; and (6) alkylene oxide adducts of the aforesaid initiators such as propylene or ethylene oxide adducts of glycerol having a relatively low average molecular weight up to about 650. Particularly useful in the preparation of flexible polyether urethane foam are the polyether polyols having an average hydroxyl functionality of from 2 to about 4 and, as aforementioned, a hydroxyl number from about 20 to about 125.

The above-described polyether polyols are normally liquid materials and, in general, are prepared in accordance with well known techniques comprising the reaction of one or more polyhydric starters and an alkylene oxide in the presence of an oxyalkylation catalyst. Usually, the catalyst is an alkali metal hydroxide such as, in particular, potassium hydroxide. The oxyalkylation of the polydydric initiator is carried out at temperature ranging from about 90° C. to about 150° C. and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations, as defined above. The alkylene oxides most commonly employed in providing the reactants encompassed by Polyol I, are the lower alkylene oxides, that is, compounds having from 2 to 4 carbon atoms including ethylene oxide, propylene oxide, butylene oxides (1,2- or 2,3-) and combinations thereof. When more than one type of oxyalkylene unit is desired in the polpolyol product, the alkylene oxide reactants may be fed to the reaction system sequentially to provide polyoxyalkylene chains containing respective blocks of different oxyalkylene units or they may be fed simultaneously to provide substantially random distribution of units. Alternatively, the polyoxyalkylene chains may consist essentially of one type of oxyalkylene unit such as oxypropylene capped with oxyethylene units.

A second class of organic polyol reactants that are suitable for use in preparing polyurethane foams in accordance with the present invention are polymer/polyols which, for convenience, are referred to herein as Polyol II. Such polyols have hydroxyl numbers from about 18 to about 65. They are produced by polymerizing one or more ethylenically unsaturated monomers dissolved or dispersed in any of the other types of organic polyol reactants described herein, in the presence of a free radical catalyst. Illustrative of suitable substrate polyols for producing such compositions are those polyether polyols encompassed by the definition of Polyol I which have an average hydroxyl functionality from 2 to about 5. Also effective as the substrate polyol are the polyether polyols defined hereinbelow as Polyol III. Illustrative of the ethylenically unsaturated monomers are vinyl compounds having the general formula,

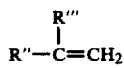

wherein R" is hydrogen, methyl or any of the halogens (i.e., fluorine, chlorine, bromine or iodine); and R'" is R", cyano, phenyl, methyl-substituted phenyl, carboalkoxy, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, vinyl chloride, vinylidene chloride, styrene, alphamethylstyrene, methyl methacrylate, and butadiene. In general, such compositions are prepared by polymerizing the monomers in the substrate polyol at a temperature between about 40° C. and about 150° C. employing any free radical-generating initiator including peroxides, persulfates, percarbonates, perborates and azo compounds. Illustrative of suitable initiators are: hydrogen peroxide, dibenzoyl peroxide, benzoyl hydroperoxide, lauroyl peroxide and azobis(isobutyronitrile).

The polymer/polyol compositions usually contain from about 5 to about 50, and more usually from about 10 to about 40, weight percent of the vinyl monomer or monomers polymerized in the substrate polyether polyol. Especially effective polymer/polyols are those having the following composition:

(A) from about 10 to about 30 weight percent of a compolymer of (1) acrylonitrile or methacrylonitrile, and (2) styrene or alpha-methylstyrene, the said copolymer containing from about 50 to 75 and from about 50 to 25 weight percent of monomeric units of (1) and (2) respectively; and (B) from about 90 to about 70 weight percent of one or more of the aforementioned types of substrate polyether polyols.

The organic polyols (polyether polyols) employed in producing high resilience polyether polyurethane foam in accordance with the process of this invention have the following combination of characteristics: (1) an average hydroxyl functionality from 2.1 to about 5; (2) a hydroxyl number from about 40 to 18; and (3) an average primary hydroxyl content between about 35 and 85 mole percent, based on the total number of hydroxyl groups contained on the polyol. For convenience, this particular class of polyols are referred to herein as Polyol III. This class of polyols is derived from ethylene oxide and propylene oxide and one of the aforesaid organic initiators having a hydroxyl functionality from about 3 to about 5 (such as, for example, glycerol) including appropriate mixtures of such initiators with one another and/or in combination with dihydric starters. The high primary hydroxyl content is introduced by capping of the polyoxyalkylene chains with at least a portion of the total ethylene oxide feed. Such highly reactive polyethers (i.e., Polyol III) are also especially useful as the substrate polyol in which the above-described polymer/polyols are formed.

For formation of high-resilience foam, the organic polyol reactant comprises a polyether polyol within the class defined above as Polyol III. They may be used as essentially the sole type of polyether polyol in the formulation or they may be employed in combination with other polyols to control the degree of softness or firmness of the foam and to vary the load-bearing properties. For example, when softer grade high-resilience foams are desired, Polyol III may be used in combination with polyether diols such as the above-described lower alkylene oxide adducts of a dihydric initiator such as dipropylene glycol. However, when firm grades of high-resilience foams having enhanced load-bearing properties are desired, the organic polyol reactant of the foam formulation preferably comprises a polymer/polyol. In such high-resilience formulations, the organic polyol reactant is constituted of from about 20 up to about 60 weight percent of polymer/polyol and correspondingly from about 80 to about 40 weight percent of those polyether polyols encompassed by the definition of Polyol III. Usually, the high-resilience formulation contains no more than about 50 weight percent of polymer/polyol based on the weight of total polyol reactant contained in the formulation. One can also use mixtures of polyether polyols and polyester polyols, if desired.

The organic polyisocyanates that are useful in producing flexible polyester polyurethane foam, flexible polyether polyurethane foam and high resilience polyether polyurethane foam in accordance with the process of this invention are organic compounds that contain at least two isocyanato groups. Such compounds are well known in the art of producing polyurethane foams, and are conveniently represented by the general formula:

wherein: i has an average value of at least two and is usually no more than six, and Q' represents an aliphatic, cycloaliphatic or aromatic radical which can be an unsubstituted hydrocarbyl group or a hydrocarbyl group substituted, for example, with halogen or alkoxy. For example, Q' can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1,6-hexamethylene diisocyanate; 1,4-tetramethylene diisocyanate; 1-methyl-2,4-diisocyanatocyclohexane; bis(4-isocyanatophenyl)methane; 4-methoxy-1,4-phenylenediisocyanate; 4-chloro-1,3-phenylenediisocyanate; 4-bromo-1,3-phenylenediisocyanate; 5,6-dimethyl-1,3-phenylenediisocyanate; 2,4-tolylene diisocyanate; 2,6-tolylene diisocyanate; mixtures of the 2,4- and 2,6-tolylene diisocyanates; crude tolylene diisocyanates; 6-isopropyl-1,3-phenylenediisocyanate; durylene diisocyanate; triphenylmethane-4,4',4"-triisocyanate; and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula:

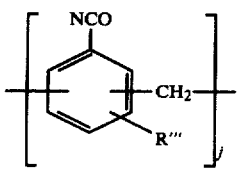

wherein R'''is hydrogen and/or lower alkyl having from 1 to 4 carbon atoms and j has an average value of at least 2.1. Preferably the lower alkyl radical is methyl and j has an average value of from 2.1 to about 3.2. Particularly useful polyisocyanates of this type are the commercially available polyphenylmethylene polyisocyanates produced by phosgenation of the polyamine obtained by acid-catalyzed condensation of aniline with formaldehyde. These products are low viscosity (50–100 centipoises at 25° C.) liquids having average isocyanato functionalities between about 2.25 and about 3.2 or higher, depending upon the specific aniline-to-formaldehyde molar ratio used in the polyamine preparation.

Other useful polyisocyanates are combinations of diisocyanates with polymeric isocyanates containing more than two isocyanato groups per molecule. Illustrative of such combinations are: a mixture of 2,4-tolylene diisocyanate, 2,6-tolylene diisocyanate and the aforesaid polyphenylmethylene polyisocyanates and/or polymeric tolylene diisocyanates obtained as residues from the manufacture of the diisocyanates.

On a combined basis, the organic polyol and organic polyisocyanate usually constitute the major proportion by weight of the polyurethane-forming reaction mixture. In general, the polyisocyanate and organic polyol reactants are employed in relative amounts such that the ratio of total -NCO equivalents to total active hydrogen equivalent (of the organic polyol and any water, when used) is from 0.8 to 1.5, preferably from 1.0 to 1.25, equivalents of -NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is preferably within the range from about 100 to 125 percent.

Foaming is accomplished by the presence in the foam formulation of varying amounts of a polyurethane blowing agent such as water which, upon reaction with isocyanate, generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon agents suitable for use in foaming formulations of this invention include: trichloromonofluoromethane; dichlorodifluoromethane; 1,1-dichloro-1-fluoroethane; 1,2,2-trifluoro-1,1,2-trichloroethane; 1,1,1-trifluoro-2-fluoro-3,3-difluoro-4,4,4-trifluorobutane; hexafluorocyclobutene; and octafluorocyclobutane.

In general, the blowing agent is employed in an amount from about 1 to about 100 parts by weight per 100 parts by weight of total polyol reactant, the particular blowing agent and amount thereof depending upon the type of foam product desired. When water is used as the sole or as a partial source of blowing action, generally no more than about 10 p.p.h.p. of water is introduced to the foam system. Flexible polyether foam and high-resilience foam are blown with water either as the sole source of blowing action or in combination with up to about 40 p.p.h.p. of fluorocarbon such as trichlorofluoromethane. Flexible foam formulations usually contain from about one to about 6 p.p.h.p. of water. The more usual water concentration for high-resilience foam systems is from about one to about 4 p.p.h.p.

In producing cellular polyurethanes in accordance with the process of this invention, a minor amount of a foam stabilizing surfactant may also be present as an additional component of the polyurethane-forming reaction mixture to stabilize the foam during its formation. When used, such surfactants are usually present in amounts up to about 5 parts by weight per 100 parts by weight of total polyol reactant.

Suitable classes of silicone surfactants are the polysiloxane-polyoxyalkylene block copolymers wherein the respective blocks are joined through silicon-to-carbon or silicon-to-oxygen-to-carbon bonds and the respective polyoxyalkylene blocks are bonded to different silicon atoms of the polysiloxane backbone to form a comb-like structure. Usually, the polysiloxane blocks are trialkylsiloxy-endblocked. In addition to the siloxy units to which the pendant polyoxyalkylene chains are bonded, the polysiloxane backbone is formed of difunctional siloxy units wherein the respective two remaining valences of silicon are satisfied by bonds to organic radicals. Illustrative of such organic radicals are hydrocarbyl groups having from 1 to 12 carbon atoms including alkyl, aryl, aralkyl, bicycloheptyl and halogen-substituted derivatives of such groups. The polyoxyalkylene blocks are usually constituted of oxyethylene units, oxypropylene units or a combination of such units, and the polyoxyalkylene chains are hydroxyl-terminated or capped with a monovalent organic group such as alkyl, aryl, aralkyl, acyl, carbamyl and the like. Especially useful as stabilizers of flexible polyether polyurethane foams are the block copolymers described in U.S. Pat. No. Reissue 27,541. The copolymers of the latter patent contain from 40 to 200 dimethylsiloxy units as essentially the sole type of difunctional unit, and from 15 to 60 weight percent of the oxyalkylene content of the polyoxyalkylene blocks is constituted of oxyethylene. Also useful as stabilizers of flexible polyether polyurethane foam are the block copolymers described in U.S. Pat. No. 3,657,305. The polysiloxane backbone of the organo-silicones of the latter patent contains an average of from 10 to 200 dimethylsiloxy units in combination with from 1 to 50 methyl-aralkylsiloxy units such as, in particular, methylphenylethylsiloxy units [(CH$_3$)(C$_6$H$_5$CH$_2$CH$_2$)SiO]. Other useful stabilizers for flexible polyether polyurethane foam are the block copolymers described in U.S. Pat. No. 3,686,254. Also suitable are the branched copolymers described in U.S. Pat. No. 2,834,748.

With respect to formation of flexible polyester polyurethane foams, suitable silicon-containing form stabilizers include the polysiloxane-polyoxyalkylene block copolymers described, for example, in U.S. Pat. Nos. 3,563,924 and 3,594,334. Such copolymers include those characterized by a particular molecular weight (600–1700), siloxane content (14–40 weight percent based on the weight of the copolymer) and oxyethylene content (at least 75 weight percent based on the total amount of oxyalkylene groups in the copolymer). These organosilicones are usually employed in combination with an anionic, silicon-free organic emulsifier such as those described in said U.S. Pat. No. 3,594,334, the teachings of which are incorporated herein by reference. Also effective as stabilizers of flexible polyester polyurethane foams are the organosilicones containing tetrafunctional $SiO_4$ units described and claimed in U.S. Pat. No. 3,793,360.

Unlike flexible polyether polyurethane foams, stabilization of flexible polyester polyurethane foams may also be effected in the presence of silicon-free organic surfactants. One significant property of the tertiary amine catalyst mixtures of this invention is that they allow for the formation of pumpable aqueous activator streams containing the silicon-free organic surfactants.

Silicon-free, organic surfactants suitable as stabilizers of flexible polyester polyurethane foams as described herein are known to the art and are employed in amounts up to about 5 p.p.h.p. One class of organic surfactants suitable for this purpose is the products obtained by the reaction of amines such as, in particular, diethylamine, with long chain fatty acids such as oleic acid or with sulfonated $C_{10}$-$C_{15}$ alkylated aromatic hydrocarbons. Another class is the liquid, anionic organic surfactants having at least one carbon-bonded sulfonic acid group (—$SO_3H_4$) or an ammonium, quaternary ammonium, alkali metal or alkaline earth metal derivative of said sulfonic acid group. The sulfonic acid groups or salt derivatives thereof can be substituents on a wide variety of "backbone" organic compounds which provide the hydrophobic portion of the surfactant. The hydrophobic portion may consist of carbon and hydrogen as in sulfonated hydrocarbons (or salt derivatives thereof) having from 10 to 20 or more carbon atoms such as alkanes, high alkyl-substituted benzenes, and liquid petroleum fractions, as typically illustrated by sodium tetradecyl sulfonate, sodium dodecylbenzene sulfonate and sodium and potassium salts of sulfonated mineral oil. The —$SO_3H$ group or salt derivative thereof may also be a substituent on an organic backbone consisting of carbon, hydrogen and oxygen wherein oxygen is present in an ether linkage as in polyoxyalkylene groups or in a carboxylic acid ester group. Typical of such compounds are those obtained by sulfating or sulfonating oxyalkylated fatty acid esters wherein the oxyalkylation is usually effected with ethylene oxide, propylene oxide or a combination thereof. These and other organic stabilizers of flexible polyester polyurethane foams are known to the art; see, for example, the description thereof in U.S. Pat. No. 3,594,334.

Because of the high reactivity of high-resilience foam formulations, the foams are generally self-stabilizing and can be obtained without the use of stabilizing agents. However, it is usually desirable to include a silicone surfactant as an additional component of such formulations in order to minimize the tendency of the foam to settle and to control cell uniformity. Particularly effective for this purpose are the relatively low molecular weight polyoxyalkylene-polysiloxane block copolymers described and claimed in U.S. Pat. No. 3,741,917. Especially suitable as components of high-resilience formulations are the block copolymers described therein having the formula,

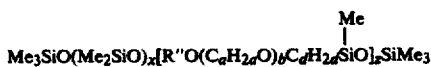

wherein x has an average value of from 2 to 7; b has a value from 3 to 10; z has an average value from 2 to 6; a and d each has a value from 2 to 4; and R" is a monovalent hydrocarbon radical such as alkyl, aralkyl and aryl radicals, or an acyl group.

Also suitable as organosilicone components of high-resilience foam formulations are the relatively low molecular weight aralkyl-modified polymethylsiloxane oils described and claimed in U.S. Pat. No. 3,839,384.

When used, the organosilicone component is usually present in high-resilience formulations in an amount between about 0.025 and about 2 parts by weight per 100 parts by weight of total polyol reactant.

Other additional ingredients can be employed in minor amounts in producing flexible polyester polyurethane foam, flexible polyether polyurethane foam, and high resilience polyether polyurethane foam, in accordance with the process of this invention, if desired, for specific purposes. Thus, flame retardants [e.g., tris(2-chloroethyl)phosphate] can be used to reduce any tendency of the polyurethane foam to burn. Illustrative of other such additives that can be employed are: compression set additives (e.g., hexylene glycol); additives to regulate cell structure so as to coarsen cells and thereby reduce the tendency of the foam to split (e.g., paraffin oil); fillers; dyes; pigments; antidiscoloration additives including anti-scorch, and anti-oxidation agents; and the like. All of these are well known in the art and they are used at their conventional concentrations, also well known.

The process described herein for the production of cellular polyurethanes is usually carried out as a "one-shot" process in which the organic polyol and organic polyisocyanate reactants are rapidly mixed to produce the foam-producing reaction mixture. The foaming and urethane-forming reactions occur without the application of external heat. In some instances the resulting foam is cured by heating the foam at a temperature between about 100° C. and about 150° C. for about 10 to about 60 minutes to eliminate any surface tackiness, if desired. It is to be understood that variations in process conditions and manipulative steps can be used as known in the art. For example, the various ingredients of the reaction mixture can be combined and the foaming reaction mixture poured into a mold, or the various ingredients can be combined and the foaming reaction mixture commenced and completed in a mold.

The relative amounts of the various components reacted in accordance with the above-described process for producing cellular polyurethanes are not narrowly critical. The organic polyol and organic polyisocyanate are present in the foam-producing formulation in a major amount. The relative amounts of these two components are the amounts required to produce the urethane structure of the foam and such relative amounts are well known in the art. The source of the blowing action such as water, auxiliary blowing agents, tertiary-amine catalyst mixtures and the organosiloxane composition foam stabilizers are each present in a minor amount necessary to achieve the function of the component. Thus, the blowing agent is present in a minor amount sufficient to foam the reaction mixture, the tertiary-amine catalyst mixture is present in a catalytic amount (i.e., an amount sufficient to catalyze the reaction to produce the polyurethane at a reasonable rate), and the organosiloxane compositions are present in a foam-stabilizing amount, that is, in an amount sufficient to stabilize the foam. The preferred amounts of these various components are as given hereinabove.

The cellular urethanes produced in accordance with the present invention are useful as cushioning materials in furniture, transportation systems (e.g., automobiles, planes, etc.), packaging of delicate objects, textile interliners, and gasketing materials, or in any of the other applications in which cellular polyurethane foams are employed.

The following examples are illustrative of the present invention and are not intended as a limitation upon the scope thereof. Unless otherwise indicated, all parts are by weight.

| Definitions |  |
|---|---|
| As used in the Examples appearing hereinafter, the following designations, terms and abbreviations have the indicated meanings: | |
| in. | inches |
| lbs. | pounds |
| percent | weight percent |
| pcf | pounds per cubic foot |
| SCFM | standard cubic feet per minute |
| VAZO | Azobisisobutyronitrile |
| Density | The density of the foam in pounds per cubic foot. |
| Cream Time (Seconds) | The time in seconds which it takes for the foam-forming mixture to go from a homogeneous clear liquid to a heterogeneous milky liquid. |
| Rise Time (Seconds) | The time in seconds which it takes the foam to reach its maximum height. |
| Exit Time (Seconds) | The time in seconds which it takes the foam to extrude from the mold. |
| Cells Per Inch | The number of cells per linear inch of the foam, the number being directly proportional to the fineness of the cell structure. |
| Breathability of Porosity | The porosity of a foam, being roughly proportional to the number of open cells in a foam and being measured in accordance with the NOPCO breathability test procedure described by R. E. Jones and G. Fesman, Journal of Cellular Plastics, January, 1965. This is a measure of the air flow through a 2-inch by 2-inch by 1-inch foam sample, expressed as standard cubic feet per minute. |
| ILD (Identation Load Deflection) | ASTM D1564-69 |
| Compression Set | ASTM D1564-69 |

In accordance with Examples 1 to 13 inclusive, the following tertiary amines were employed as essential components in the preparation of the tertiary amine catalyst mixtures of this invention.

| Tertiary Amine I: | 2-hydroxyethyl piperazine |
|---|---|
| Tertiary Amine II: | 1,4-di-(2-hydroxyethyl) piperazine |
| Tertiary Amine III: | 2-(2-dimethylaminoethoxy) ethanol |
| Tertiary Amine IV: | bis[2-(N,N—dimethylamino)ethyl] ether |
| Tertiary Amine V: | N,N—dimethylethanolamine |
| Tertiary Amine VI: | 3-dimethylamino-N,N—dimethyl-propionamide |
| Tertiary Amine VII: | N—ethylmorpholine |
| Tertiary Amine VIII: | 1,4-diazobicycol [2.2.2] octane ("triethylenediamine") |

EXAMPLES 1 THROUGH 13

PREPARATION OF NOVEL TERTIARY AMINE CATALYST MIXTURES

A series of novel tertiary amine catalyst mixtures of this invention was prepared containing a hydroxyalkyl piperazine and at least one other tertiary amine compound. These mixtures were produced by blending the tertiary amines, in the amounts stated in Table I, at room temperature. The tertiary amine catalyst mixtures produced are identified in Table I as Tertiary Amine Catalyst Mixtures A to M, inclusive, with the concentration of each component in the mixture stated as weight percent of said mixture. These mixtures were used to produce polyurethane foams in the subsequent examples.

TABLE I

| NOVEL TERTIARY AMINE CATALYST MIXTURES | | | |
|---|---|---|---|
| Example | Tertiary Amine Catalyst Mixture Identification | Tertiary Amine Component/Weight Percent | |
| 1 | A | I/40 | III/60 |
| 2 | B | I/25 | VII/75 |
| 3 | C | I/10 | IV/90 |
| 4 | D | I/25 | VI/75 |
| 5 | E | I/20 | V/80 |
| 6 | F | I/80 | IV/20 |
| 7 | G | I/90 | IV/10 |
| 8 | H | I/60 | V/40 |
| 9 | I | I/50 | V/50 |
| 10 | J | I/90 | VIII/10 |
| 11 | K | I/80 | VI/20 |
| 12 | L | I/7.5 | II/7.5 | VIII/85 |
| 13 | M | I/15 | II/15 | VII/70 |

EXAMPLES 14 THROUGH 50

In accordance with these examples, flexible polyester polyurethane foams were produced using various of the above-described tertiary amine catalyst mixtures of the present invention containing a hydroxyalkyl piperazine in the mixture as the catalytic component of the foam-producing reaction mixtures. For the purpose of comparison, selected individual tertiary amines and tertiary amine mixtures outside the scope of this invention were used as the catalytic component of the foam-producing reaction mixtures and are designated herein as Tertiary Amine I, Tertiary Amine III, Tertiary Amine IV, Tertiary Amine V, Tertiary Amine VI, Tertiary Amine VII and Tertiary Amine VIII, all of which are described previously, and also Tertiary Amine Mixture NN, Tertiary Amine Mixture OO and Tertiary Amine Mixture PP. The comparative tertiary amine mixtures outside the scope of this invention have the following composition:

Tertiary Amine Mixture NN: A composition consisting of 80 percent by weight 3-dimethylamino-N,N-dimethylpropionamide and 20 percent by weight 2-(2-dimethylaminoethoxy)ethanol. This mixture contains no hydroxyalkyl piperazine.

Tertiary Amine Mixture OO: A composition consisting of 20 percent by weight 3-dimethylamino-N,N-dimethylpropionamide and 80 percent by weight 2-(2-dimethylaminoethoxy)ethanol. This mixture contains no hydroxyalkyl piperazine.

Tertiary Amine Mixture PP: A composition consisting of 60 percent by weight 3-dimethylamino-N,N-dimethylpropionamide and 40 percent by weight 2-(2-dimethylaminoethoxy)ethanol. This mixture contains no hydroxyalkyl piperazine.

The composition and ingredients of the flexible polyester polyurethane foam-producing reaction mixture employed in Examples 14 to 50 inclusive is given below in Table II.

TABLE II

| Flexible Polyester Polyurethane Foam Formulation | |
|---|---|
| Ingredients | Parts by Weight |
| Polyester Polyol I: A commercially available polyester resin produced from adipic acid, diethylene glycol and trimethylol propane in a mole ratio of approximately 1:1:0.2. This polyester has a hydroxyl number of about 50 to 56, a molecular weight of about 2,000, an acid number not greater than 2 and a viscosity of about 17,000 centistokes at about 25° C. | 100 |
| Water | 3.6 |
| Isocyanate I (Index 105): A mixture of about 80 weight percent 2,4-tolylene diisocyanate and about 20 weight percent 2,6-tolylene diisocyanate. Index 105 means that the amount of mixture employed was 105 percent of the stoichiometric amount required to react with the polyester polyol and water present in the foam formulation. | 44.6 |
| Tertiary Amine Catalyst Mixtures A-M | Varied |
| Hexadecyldimethylamine | 0.25 |
| Silicone Surfactant I: A flexible polyester polyurethane foam surfactant mixture within the scope of U.S. Pat. No. 3,594,334. | 1.0 |

The manipulative steps involved in the preparation of flexible polyester polyurethane foams of Examples 14 to 50 inclusive were as described below under Foam Procedures I.

Foam Procedure I

The silicone surfactant, tertiary amine catalyst mixture and water (activator mixture) were premixed in a 50 milliliter beaker. The polyester polyol reactant was weighed into a tared 32-ounce capacity container followed by the addition thereto of the polyisocyanate reactant and mixing of these two reactants with a spatula until homogeneous. Further mixing was done on a drill press equipped with a double three-bladed marine-type propeller about 3 inches in diameter. The mixing in the drill press was accomplished at 1000 revolutions per minute for about 8 seconds. Then the aforesaid activator mixture of silicone surfactant, tertiary amine catalyst mixture and water was added and mixing was continued for about 7 additional seconds. The reaction mixture was poured into a 12 inch by 12 inch by 12 inch cardboard box and was allowed to cure and rise to its maximum height. The foam was then postcured for about 30 minutes at 120° C. The foam was then removed from the oven and aged for 24 hours at ambient temperature before being processed and observed for properties.

The results of examples in which the tertiary amine catalyst mixtures of this invention were utilized as the catalytic component of the foam-producing reaction mixture are given in Table III below and compared with the results of catalyst mixtures and single catalyst components in Examples 29 to 50 that do not contain a hydroxyalkyl piperazine compound.

TABLE III
EVALUATION OF TERTIARY AMINE CATALYST MIXTURES IN FLEXIBLE POLYESTER POLYURETHANE FOAM FORMULATIONS

| EXAMPLE | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|
| Polyester Polyol I, parts | 100 | 100 | 100 | 100 | 100 | 100 | 100 | 100 | 100 | 100 | 100 | 100 | 100 | 100 | 100 | 100 | 100 | 100 |
| Water, parts | 3.6 | 3.6 | 3.6 | 3.6 | 3.6 | 3.6 | 3.6 | 3.6 | 3.6 | 3.6 | 3.6 | 3.6 | 3.6 | 3.6 | 3.6 | 3.6 | 3.6 | 3.6 |
| Tertiary Amine Catalyst | A | A | A | F | F | G | G | H | H | I | I | J | J | K | K | NN* | NN* | NN* |
| Mixture or Tertiary Amine Type | | | | | | | | | | | | | | | | | | |
| Tertiary Amine Catalyst | 0.4 | 0.6 | 0.7 | 0.6 | 0.8 | 0.8 | 1.0 | 0.8 | 1.0 | 0.8 | 1.0 | 0.8 | 1.0 | 0.8 | 1.0 | 0.4 | 0.6 | 0.8 |
| Mixture or Tertiary Amine, parts | | | | | | | | | | | | | | | | | | |
| Hexadecyldimethylamine, parts | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
| Silicone Surfactant I, parts | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Isocyanate I (Index 105), parts | 44.6 | 44.6 | 44.6 | 44.6 | 44.6 | 44.6 | 44.6 | 44.6 | 44.6 | 44.6 | 44.6 | 44.6 | 44.6 | 44.6 | 44.6 | 44.6 | 44.6 | 44.6 |
| Cream Time, Seconds | 14–15 | 12 | 11 | 13–14 | 12 | 14–15 | 12–13 | 12 | 10–11 | 10–11 | 11 | 11–12 | 12 | 13–14 | 11 | 12–13 | 12 | 11 |
| Rise Time, Seconds | 47 | 76 | 67 | 108 | 24 | 117 | 116 | 80 | 77 | 78 | 74 | 84 | 83 | 79 | 78 | 81 | 71 | 63 |
| Cells Per Inch | 40–45 | 45–50 | 45–50 | 40–45 | 40–45 | 40–45 | 40–45 | 40–45 | 40–45 | 40–45 | 40–45 | 40–45 | 40–45 | 40–45 | 40–45 | 45–50 | 45–50 | 45–50 |
| Density, pcf | 1.71 | 1.63 | 1.60 | 1.77 | 1.69 | 1.66 | 1.71 | 1.69 | 1.68 | 1.71 | 1.72 | 1.73 | 1.68 | 1.68 | 1.71 | 1.61 | 1.63 | 1.58 |
| Breathability, SCFM | 1.6 | 1.65 | 1.65 | 2.3 | 2.7 | 3.75 | 3.55 | 1.7 | 2.35 | 0.65 | 1.05 | 1.9 | 1.8 | 1.75 | 2.35 | 1.75 | 1.9 | 1.6 |
| Activator Mixture, Solubility | Clear | Clear | Clear | Clear | Clear | Clear | Clear | Clear | Clear | Clear | Clear | Clear | Clear | Cloudy | Cloudy | Cloudy | Cloudy | Cloudy Top Shrinkage |
| Comments | — | — | — | — | — | — | — | — | — | — | — | — | — | — | — | — | — | |

| EXAMPLE | 32 | 33 | 34 | 35 | 36 | 37 | 38 | 39 | 40 | 41 | 42 | 43 | 44 |
|---|---|---|---|---|---|---|---|---|---|---|---|---|---|
| Polyester Polyol I, parts | 100 | 100 | 100 | 100 | 100 | 100 | 100 | 100 | 100 | 100 | 100 | 100 | 100 |
| Water, parts | 3.6 | 3.6 | 3.6 | 3.6 | 3.6 | 3.6 | 3.6 | 3.6 | 3.6 | 3.6 | 3.6 | 3.6 | 3.6 |
| Tertiary Amine Catalyst | OO* | OO* | OO* | PP* | PP* | I* | I* | I* | I* | III* | III* | III* | IV* |
| Mixture or Tertiary Amine Type | | | | | | | | | | | | | |
| Tertiary Amine Catalyst | 0.4 | 0.5 | 0.6 | 1.0 | 1.2 | 1.4 | 2.5 | 4.0 | 6.0 | 0.5 | 0.3 | 0.4 | 0.4 |
| Mixture or Tertiary Amine, parts | | | | | | | | | | | | | |
| Hexadecyldimethylamine, parts | 0.25 | 0.25 | 0.25 | 0.25 | 0.25 | 0.25 | 0.25 | 0.25 | 0.25 | 0.25 | 0.25 | 0.25 | 0.25 |
| Silicone Surfactant I, parts | 1.0 | 1.0 | 1.0 | 1.0 | 1.0 | 1.0 | 1.0 | 1.0 | 1.0 | 1.0 | 1.0 | 1.0 | 1.0 |
| Isocyanate I (Index 105), parts | 44.6 | 44.6 | 44.6 | 44.6 | 44.6 | 44.6 | 44.6 | 44.6 | 44.6 | 44.6 | 44.6 | 44.6 | 44.6 |
| Cream Time, Seconds | 11–12 | 11–12 | 10–11 | 12 | 11 | 26 | 19–20 | 13 | 9 | 12–13 | 13–14 | 12–13 | 13 |
| Rise Time, Seconds | 75 | 66 | 58 | 80 | 70 | 167 | 159 | 151 | 144 | 64 | 88 | 78 | 73 |
| Cells Per Inch | 40–45 | 35–40 | 40–45 | 45–50 | 45–50 | 30–35 | 30–35 | 30–35 | 30–35 | 35–40 | 30–35 | 30–35 | 45–50 |
| Density, pcf | 1.61 | 1.60 | 1.69 | 1.60 | 1.69 | 2.1 | 1.9 | 1.96 | 1.91 | 1.62 | 1.67 | 1.68 | 1.62 |
| Breathability, SCFM | 1.4 | 2.5 | 1.3 | 1.7 | 1.93 | 1.9 | 2.55 | 2.05 | 2.35 | 1.2 | 1.3 | 1.05 | 1.5 |
| Activator Mixture, Solubility | Cloudy | Cloudy Top Shrinkage | Cloudy Top Shrinkage | Cloudy Top Shrinkage | Cloudy Top Shrinkage | Cloudy Top Shrinkage Coarse Cells | Cloudy Top Shrinkage Coarse Cells | Cloudy Top Shrinkage Coarse Cells | Cloudy Top Shrinkage Coarse Cells | Cloudy Top Shrinkage | Cloudy Top Shrinkage Coarse Cells | Cloudy Top Shrinkage Coarse Cells | Cloudy Top Shrinkage |

| EXAMPLE | 45 | 46 | 47 | 48 | 49 | 50 |
|---|---|---|---|---|---|---|
| Polyester Polyol I, parts | 100 | 100 | 100 | 100 | 100 | 100 |
| Water, parts | 3.6 | 3.6 | 3.6 | 3.6 | 3.6 | 3.6 |
| Tertiary Amine Catalyst | V* | VI* | VI* | VI* | VII* | VIII* |
| Mixture or Tertiary Amine Type | | | | | | |
| Tertiary Amine Catalyst | 0.5 | 0.4 | 0.6 | 0.5 | 2.0 | 0.4 |
| Mixture or Tertiary Amine, parts | | | | | | |
| Hexadecyldimethylamine, parts | 0.25 | 0.25 | 0.25 | 0.25 | 0.25 | 0.25 |
| Silicone Surfactant I, parts | 1.0 | 1.0 | 1.0 | 1.0 | 1.0 | 1.0 |
| Isocyanate I (Index 105), parts | 44.6 | 44.6 | 44.6 | 44.6 | 44.6 | 44.6 |

TABLE III-continued
EVALUATION OF TERTIARY AMINE CATALYST MIXTURES
IN FLEXIBLE POLYESTER POLYURETHANE FOAM FORMULATIONS

| | | | | | | |
|---|---|---|---|---|---|---|
| Cream Time, Seconds | 13-14 | 15-16 | 12 | 112 | 13 | 12 |
| Rise Time, Seconds | 79 | 88 | 68 | 76 | 76 | 75 |
| Cells Per Inch | 35-40 | 35-40 | 35-40 | 35-40 | Coarse | 45-50 |
| Density, pcf | 1.72 | 1.60 | 1.63 | 1.66 | 1.65 | 1.63 |
| Breathability, SCFM | 1.2 | 1.7 | 1.2 | 0.8 | 1.2 | 1.60 |
| Activator Mixture, Solubility | Cloudy | Cloudy | Cloudy | Cloudy | Cloudy | Cloudy |
| Comments | Top Shrinkage | Top Shrinkage Coarse Cells | Top Shrinkage Coarse Cells | Top Shrinkage Coarse Cells | Top Shrinkage Coarse Cells | Top Shrinkage |

*Outside scope of this invention.

The data of Table III demonstrates that Tertiary Amine Catalyst Mixtures A, F, G, H, I, J and K of this invention are effective catalysts in the formulation of flexible polyester polyurethane foam as evidenced by excellent physical properties including good formulation reactivity as reflected by rise time and possess the further desirable property of wide processing latitude. This is evidenced from the available examples in which the tertiary amine catalyst mixtures, when employed in various concentration amounts of relativity wide latitude, produce flexible polyester polyurethane foams having desirable physical properties including good formulation reactivity as reflected by the rise times. With the exception of Tertiary Amine Catalyst Mixture K, the remaining Tertiary Amine Catalyst Mixtures A, F, G, H, I and J result in a clear solution when employed in combination with a silicone surfactant and water to form the activator mixture useful in foam formulations. A cloudy activator mixture solution indicates the presence of insoluble particles which may have an adverse effect on foam physical properties. It was also observed that freshly prepared flexible polyester polyurethane foams of Examples 14 through 28 were nearly odorless and were essentially free of amine odor. Inasmuch as the comparative flexible polyester polyurethane foam of Example 49 had a strong amine odor, it is evident that the tertiary amine catalyst mixtures of this invention are advantageously used as direct replacements for N-ethylmorpholine. The data and results of comparative Examples 29 to 50 show that inferior results are achieved with the use of other catalyst compositions.

EXAMPLES 51 THROUGH 60

In accordance with these examples, flexible polyester polyurethane foams were produced on an industrial scale machine using Tertiary Amine Catalyst Mixtures A, E and I as the catalytic component of the foam-producing reaction mixtures. For the purpose of comparison, selected individual tertiary amines outside the scope of this invention were used and are designated herein as Tertiary Amine IV and Tertiary Amine VII. Tertiary Amine IV was employed in Examples 59 and 60 as a mixture consisting of 70 percent by weight bis[2-(N,N-dimethylamino)ethyl] ether and 30 percent by weight dipropylene glycol.

The composition and ingredients of the flexible polyester polyurethane foam-producing reaction mixture employed in Examples 51 to 60 inclusive are given below in Table IV.

TABLE IV

Flexible Polyester Polyurethane Foam Formulation (Industrial Scale Machine)

| Ingredients | Parts by Weight |
|---|---|
| Polyester Polyol I | 100 |
| Water | 3.6 |
| Isocyanate I (Index 105) | 45.1 |
| Tertiary Amine Catalyst Mixtures A, E or I | Varied |
| Hexadecyldimethylamine | 0.25 |
| Silicone Surfactant I | 1.0 |
| Organic Surfactant I: A sulfated or sulfonated fatty acid ester produced by reacting propylene oxide and ethylene oxide with a fatty acid to produce an ester and then sulfating or sulfonating the ester. | 1.4 |

The manipulative steps involved in the preparation of flexible polyester polyurethane foam employing an industrial scale machine as described in Examples 51 to 60 inclusive were as described below under Foam Procedure II.

Foam Procedure II

A Hennecke UBT-63 high pressure continuous polyurethane foam machine was used through which the following three streams were fed: (1) the polyester polyol; (2) the activator mixture containing water, tertiary amine catalyst mixtures of this invention and either a silicon-free or silicon-containing foam stabilizing surfactant; and (3) the polyisocyanate reactant. The mixer speed was about 5000 revolutions per minute and the head pressure was 10–18 pounds per square inch. At ambient temperature the emerging foam mixture was poured onto paper on a continuously moving conveyor belt. The foams were allowed to set and cure in the form of large slabs (12 feet in length, 22 inches wide and 18 inches high). After 24 hours of aging at ambient temperature, the foams were cut and submitted for physical property measurements.

The results of examples in which the tertiary amine catalyst mixtures of this invention were utilized as the catalytic component of the foam-producing reaction mixture employing an industrial sale machine are given in Table V below and comparisons made with other catalysts.

TABLE V

EVALUATION OF TERTIARY AMINE CATALYST MIXTURES IN FLEXIBLE POLYESTER POLYURETHANE FOAM (INDUSTRIAL SCALE MACHINE)

| EXAMPLE | 51 | 52 | 53 | 54 | 55 | 56 | 57 | 58 | 59 | 60 |
|---|---|---|---|---|---|---|---|---|---|---|
| Polyester Polyol I, parts | 100 | 100 | 100 | 100 | 100 | 100 | 100 | 100 | 100 | 100 |
| Water, parts | 3.6 | 3.6 | 3.6 | 3.6 | 3.6 | 3.6 | 3.6 | 3.6 | 3.6 | 3.6 |
| Tertiary Amine Catalyst Mixture or Tertiary Amine Type | A | A | E | E | E | I | I | VII* | IV* | IV* |
| Tertiary Amine Catalyst Mixture or Tertiary Amine, parts | 2.0 | 1.0 | 0.2 | 0.6 | 1.0 | 2.0 | 1.0 | 2.0 | 0.2 | 0.8 |
| Hexadecyldimethylamine, parts | 0.25 | 0.25 | 0.25 | 0.25 | 0.25 | 0.25 | 0.25 | 0.25 | 0.25 | 0.25 |
| Silicone Surfactant I, parts | 1.0 | 1.0 | — | — | — | 1.0 | 1.0 | 1.0 | — | — |
| Organic Surfactant I, parts | — | — | 1.4 | 1.4 | 1.4 | — | — | — | 1.4 | 1.4 |
| Isocyanate I (Index 105), parts | 45.1 | 45.1 | 45.1 | 45.1 | 45.1 | 45.1 | 45.1 | 45.1 | 45.1 | 45.1 |
| Cream Time, Seconds | 6 | 7 | 8 | 7 | 6 | 6 | 6 | 6 | — | — |
| Rise Time, Seconds | 82 | 83 | 78 | 75 | 74 | 73 | 82 | 70 | — | — |
| Density, pcf | 1.50 | 1.63 | 1.74 | 1.78 | 1.80 | 1.57 | 1.71 | 1.58 | — | — |
| Breathability, SCFM | .95 | .75 | .60 | .80 | .75 | 1.0 | .80 | .70 | — | — |
| ILD (4"), lbs./50in.² |  |  |  |  |  |  |  |  |  |  |
| 25% | 48 | 51 | 58 | 63 | 54 | 44 | 50 | 52 | — | — |
| 65% | 93 | 97 | 101 | 93 | 95 | 86 | 92 | 97 | — | — |
| Compression Sets, % |  |  |  |  |  |  |  |  |  |  |
| 90% | 19.0 | 11.8 | 10.8 | 12.3 | 11.7 | 12.6 | 15.8 | 14.9 | — | — |

TABLE V-continued

EVALUATION OF TERTIARY AMINE CATALYST MIXTURES IN FLEXIBLE POLYESTER POLYURETHANE FOAM (INDUSTRIAL SCALE MACHINE)

| EXAMPLE | 51 | 52 | 53 | 54 | 55 | 56 | 57 | 58 | 59 | 60 |
|---|---|---|---|---|---|---|---|---|---|---|
| Activator Mixture, Solubility | Clear | Clear | Clear | Clear | Clear | Clear | Clear | Clear | Gelled | Gelled |
| Comments | No Scorch | No Scorch | No Scorch | No Scorch | No Scorch | No Scorch | No Scorch | No Scorch | — | — |

*Outside the scope of this invention.

The data of Table V demonstrates that Tertiary Amine Catalyst Mixtures A, E and I of this invention are effective catalysts in the industrial scale machine formulation of flexible polyester polyurethane foam as evidenced by excellent physical properties including good formulation reactivity as reflected by the rise times, and possess the further desirable property of wide processing latitude. This is evidenced from the available examples in which the tertiary amine catalyst mixtures, when employed in various concentration amounts of relatively wide processing latitude, produce flexible polyester polyurethane foams having desirable physical properties including good formulation reactivity as reflected by the rise times. It was also observed that the freshly prepared flexible polyester polyurethane foams of Examples 51 through 57 were nearly odorless and were essentially free of amine odor. Inasmuch as the comparative flexible polyester polyurethane foam of Example 58 had a strong amine odor, it is evident that the tertiary amine catalyst mixtures of this invention are advantageously used as direct replacements for N-ethylmorpholine in industrial scale machine foam formulations. The results of Examples 51 through 60 further demonstrate that, with respect to the preparation of flexible polyester polyurethane foam stabilized with either silicon-containing surfactants or silicon-free organic surfactants, the tertiary amine catalyst mixtures described herein allow for the formation of activator mixtures which do not gel and thus have the processing advantage of being readily pumped. In this respect it is noted that the absence of a tertiary amine catalyst mixture in the activator mixture (as in Examples 49 and 50) causes gellation in the formulation of flexible polyester polyurethane foams utilizing only silicon-free organic surfactants. From the standpoint of flexible polyester polyurethane foam manufacture, the data of Examples 51 through 60 demonstrate that the use of tertiary amine catalyst mixtures of this invention (as exemplified by Tertiary Amine Catalyst Mixtures A, E and I) offers a particularly desirable combination of properties in that such combinations have good catalytic activity for the water-isocyanate reaction, allow for the formulation of workable activator mixtures containing either silicon-free or silicon-containing foam stabilizers, and provide foam products free of a strong amine odor. As reflected by the foam physical properties, the quality of the foam products was also excellent.

EXAMPLES 61 THROUGH 90

In accordance with these examples, flexible polyether polyurethane foams were produced using various of the above-described tertiary amine catalyst mixtures of the present invention containing a hydroxyalkyl piperazine in the mixture as the catalytic component of the foam-producing reaction mixtures. For the purpose of comparison, selected tertiary amines outside the scope of this invention were used and are designated herein as Tertiary Amine II, Tertiary Amine III and Tertiary Amine V.

The composition and ingredients of the flexible polyether polyurethane foam-producing reaction mixture employed in Examples 61 to 90 inclusive are given below in Table VI.

TABLE VI

FLEXIBLE POLYETHER POLYURETHANE FOAM FORMULATION

| Ingredients | Parts by Weight |
|---|---|
| Polyether Polyol I: A polyether polyol produced by polymerizing propylene oxide and then ethylene oxide using glycerol as a starter. This polyether polyol has an approximate molecular weight of 3500 and a hydroxy number of approximately 46. It contains about 89.0 percent by weight propylene oxide and about 11.0 percent by weight ethylene oxide. | 100 |
| Water | 4.0 |
| Isocyanate I (Index 105) | 49.7 |
| Tertiary Amine Catalyst Mixtures A-M | Varied |
| Catalyst I: Stannous octoate | 0.30 |
| Silicone Surfactant II: A flexible polyether polyurethane foam surfactant consisting of about 55 to 70 percent by weight polysiloxane-polyoxyalkylene copolymer having the formula, $Me_3SiO(Me_2SiO)_{72}[Me(C_3H_6O)_{27}(C_2H_4O)_{24}OC_3H_6SiMeO]_{5.1}SiMe_3$ and about 45 to 30 percent by weight polyether polyol. | 1.0 |

The manipulative steps involved in the preparation of flexible polyether polyurethane foams of Examples 61 to 90 inclusive were as described below under Foam Procedure III.

Foam Procedure III

The polyether polyol and polyisocyanate reactants and silicone surfactant were weighed into a ½ gallon, 5-inch diameter, cylindrical cardboard carton. The water and tertiary amine catalyst mixture of this invention were measured and blended together in a small beaker. The tin catalyst was measured into a hypodermic syringe. Eleven stainless steel baffles were inserted into the carton and centered on a drill press equipped with a 1.65-inch, four-blade turbine. A timer was pre-set for a total of 90 seconds. The mixer was started at 2400 revolutions per minute and continued for 60 seconds. The mixer was stopped manually for a 15 second degassing period. At 75 seconds on the timer, mixing was continued for 5 seconds before adding the aqueous tertiary amine catalyst mixture premix. Mixing was continued 5 seconds and the tin catalyst was added after an additional 5 seconds of mixing. The blended contents are poured into a 14 inch×14 inch×6 inch cardboard box. Both the cream time and rise time are recorded. The foam is allowed to stand at room temperature for at least 24 hours before being submitted for physical property measurements.

The results of examples in which the tertiary amine catalyst mixtures of this invention were utilized as the catalytic component of the foam-producing reaction mixture are given in Table VII below and comparisons made with other catalysts.

EXAMPLES 91 THROUGH 103

In accordance with these examples, high resilience polyether polyurethane foams were produced using Tertiary Amine Catalyst Mixtures A, B, C, F, K and M

TABLE VII
EVALUATION OF TERTIARY AMINE CATALYST MIXTURES IN FLEXIBLE POLYETHER POLYURETHANE FOAMS

| EXAMPLE | 61 | 62 | 63 | 64 | 65 | 66 | 67 | 68 | 69 | 70 | 71 | 72 | 73 | 74 | 75 |
|---|---|---|---|---|---|---|---|---|---|---|---|---|---|---|---|
| Polyether Polyol I, parts | 100 | 100 | 100 | 100 | 100 | 100 | 100 | 100 | 100 | 100 | 100 | 100 | 100 | 100 | 100 |
| Water, parts | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Tertiary Amine Catalyst Mixture or Tertiary Amine Type | A | A | A | C | C | C | D | D | D | E | E | E | F | F | F |
| Tertiary Amine Catalyst Mixture or Tertiary Amine, parts | .15 | .30 | .45 | .15 | .30 | .45 | .15 | .30 | .45 | .15 | .30 | .45 | .15 | .30 | .45 |
| Silicone Surfactant II, parts | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Catalyst I, parts | .30 | .30 | .30 | .30 | .30 | .30 | .30 | .30 | .30 | .30 | .30 | .30 | .30 | .30 | .30 |
| Isocyanate I (Index 105), parts | 49.7 | 49.7 | 49.7 | 49.7 | 49.7 | 49.7 | 49.7 | 49.7 | 49.7 | 49.7 | 49.7 | 49.7 | 49.7 | 49.7 | 49.7 |
| Cream Time, Seconds | 9 | 7 | 6 | 10 | 8 | 6 | 18 | 15 | 10 | 12 | 11 | 9 | 22 | 15 | 10 |
| Rise Time, Seconds | 91 | 83 | 65 | 80 | 70 | 61 | 97 | 91 | 89 | 110 | 102 | 81 | 129 | 111 | 98 |
| Porosity, SCFM | 3.0 | 4.1 | 5.2 | 3.6 | 4.2 | 5.8 | 3.0 | 3.9 | 4.9 | 3.0 | 4.8 | 5.2 | 2.0 | 3.1 | 3.7 |
| Comments | — | — | — | — | — | — | — | — | — | — | — | — | — | — | — |

| EXAMPLE | 76 | 77 | 78 | 79 | 80 | 81 | 82 | 83 | 84 | 85 | 86 | 87 |
|---|---|---|---|---|---|---|---|---|---|---|---|---|
| Polyether Polyol I, parts | 100 | 100 | 100 | 100 | 100 | 100 | 100 | 100 | 100 | 100 | 100 | 100 |
| Water, parts | 4.0 | 4.0 | 4.0 | 4.0 | 4.0 | 4.0 | 4.0 | 4.0 | 4.0 | 4.0 | 4.0 | 4.0 |
| Tertiary Amine Catalyst Mixture or Tertiary Amine Type | K | K | K | L | L | L | II* | II* | II* | III* | III* | III* |
| Tertiary Amine Catalyst Mixture or Tertiary Amine, parts | .15 | .30 | .45 | .15 | .30 | .45 | .15 | .30 | .45 | .15 | .30 | .45 |
| Silicone Surfactant II, parts | 1.0 | 1.0 | 1.0 | 1.0 | 1.0 | 1.0 | 1.0 | 1.0 | 1.0 | 1.0 | 1.0 | 1.0 |
| Catalyst I, parts | .30 | .30 | .30 | .30 | .30 | .30 | .30 | .30 | .30 | .30 | .30 | .30 |
| Isocyanate I (Index 105), parts | 49.7 | 49.7 | 49.7 | 49.7 | 49.7 | 49.7 | 49.7 | 49.7 | 49.7 | 49.7 | 49.7 | 49.7 |
| Cream Time, Seconds | 16 | 12 | 8 | 10 | 8 | 6 | 25 | 20 | 17 | 9 | 7 | 6 |
| Rise Time, Seconds | 104 | 98 | 82 | 102 | 83 | 71 | 189 | 174 | 157 | 84 | 70 | 62 |
| Porosity, SCFM | 3.6 | 4.7 | 5.3 | 2.0 | 4.8 | 5.1 | — | — | — | 3.6 | 4.7 | 5.3 |
| Comments | — | — | — | — | — | — | Coarse Cells and Voids | Coarse Cells and Voids | Coarse Cells and Voids | Amine Odor | Amine Odor | Amine Odor |

| EXAMPLE | 88 | 89 | 90 |
|---|---|---|---|
| Polyether Polyol I, parts | 100 | 100 | 100 |
| Water, parts | 4.0 | 4.0 | 4.0 |
| Tertiary Amine Catalyst Mixture or Tertiary Amine Type | V* | V* | V* |
| Tertiary Amine Catalyst Mixture or Tertiary Amine, parts | .15 | .30 | .45 |
| Silicone Surfactant II, parts | 1.0 | 1.0 | 1.0 |
| Catalyst I, parts | .30 | .30 | .30 |
| Isocyanate I (Index 105), parts | 49.7 | 49.7 | 49.7 |
| Cream Time, Seconds | 10 | 7 | 6 |
| Rise Time, Seconds | 102 | 95 | 83 |
| Porosity, SCFM | 2.0 | 2.5 | 3.1 |
| Comments | Slight Amine Odor | Slight Amine Odor | Slight Amine Odor |

The data of Table VII demonstrates that Tertiary Amine Catalyst Mixtures A, C, D, E, F, K and L of this invention are catalytically effective in promoting the water-isocyanate reaction in flexible polyether polyurethane foam formulations, as reflected by rise time and the highly porous nature of the foam products, and possess the further desirable property of wide processing latitude. This is evidenced from the available examples in which the tertiary amine catalyst mixtures, when employed in various concentration amounts of relatively wide processing latitude, produce flexible polyether polyurethane foams having desirable physical properties including good formulation reactivity and good foam porosity or breathability. It was also observed that the freshly prepared flexible polyether polyurethane foams of Examples 61 to 81 inclusive were nearly odorless and were essentially free of amine odor whereas the controls were not.

of the present invention containing a hydroxyalkyl piperazine in the mixture as the catalytic component of the foam-producing reaction mixtures. For the purpose of comparison, a tertiary amine mixture outside the scope of this invention was used and is designated herein as Tertiary Amine Mixture NN.

The composition and ingredients of the high resilience polyether polyurethane foam-producing reaction mixtures employed in Examples 91 to 103 inclusive are given below in Table VIII.

TABLE VIII
HIGH RESILIENCE POLYETHER POLYURETHANE FOAM FORMULATION

| Ingredients | Parts by Weight |
|---|---|
| Polyether Polyol II: A polyether polyol produced by polymerizing propylene oxide | 60 |

TABLE VIII-continued
HIGH RESILIENCE POLYETHER POLYURETHANE FOAM FORMULATION

| Ingredients | Parts by Weight |
|---|---|
| and then ethylene oxide using glycerol as a starter. This polyether polyol has an approximate molecular weight of 4500 and a hydroxyl number of approximately 34. It contains about 85.5 percent by weight propylene oxide, 14.5 percent by weight ethylene oxide and about 73 percent primary hydroxyl groups. | |
| Polymer/Polyol I: A polymer/polyol prepared by polymerizing styrene/acrylonitrile in Polyether Polyol II using VAZO as a catalyst. This polymer/polyol has a hydroxyl number of approximately 28. The polymer contains a one to one weight ratio of styrene to acrylonitrile and comprises 21 percent by weight of the total weight of the polymer/polyol. | 40 |
| Water | 2.6 |
| Isocyanate II (Index 107): A mixture consisting of about 80 percent Isocyanate I and about 20 weight percent of a polymethylene polyphenylene polyisocyanate polymer containing about 2.5 to 2.9 moles of NCO mole of polymer and having an isocyanate content of about 31.4 percent by weight. Index 107 means that the amount of mixture employed was 107 percent of the stoichiometric amount required to react with the polyether polyol, polymer/polyol and water present in the foam formulation. | 34.4 |
| Tertiary Amine Catalyst Mixtures A–M | Varied |
| Catalyst II: Dibutyltindilaurate | .015 |
| Catalyst III: A composition consisting of about 70 percent by weight Tertiary Amine IV and about 30 percent by weight dipropylene glycol solvent. | Varied |
| Catalyst IV: A composition consisting of about 33.3 percent by weight Tertiary Amine VI and about 66.7 percent by weight ethoxylated phenol solvent. | .30 |
| Catalyst V: A composition consisting of about 33 percent by weight Tertiary Amine VIII and about 67 percent dipropylene glycol solvent. | .36 |
| Silicone Surfactant III: A high resilience polyether polyurethane foam surfactant within the scope of U.S. Pat. No. 3,741,917. | 2.0 |

The manipulative steps involved in the preparation of high resilience polyether polyurethane foams of Examples 91 to 103 inclusive were as described below under Foam Procedure IV.

Foam Procedure IV

An aluminum mold (4 inches by 15 inches by 15 inches) is prepared by first waxing lightly with Brulin Permamold Release Agent and then pre-heating in a 140° C. oven for about 10 minutes to raise the temperature of the mold to 175°–200° F. Excess mold-release agent is wiped off and the mold is allowed to cool to 120° F. before foaming.

The initial mixing of the components of the foam formulation is started when the mold is cooled to about 130° F. The purpose of pre-heating the mold to the initial high temperature is to remove solvent from the mold-release agent. All components of the reaction mixture, except the polyisocyanate reactant, are measured or weighed into a ½ gallon 5-inch diameter, cylindrical, cardboard carton and mixed 60 seconds with a 2¼ inch, six-blade turbine at 4000 revolutions per minute. The polyisocyanate reactant is then weighed into the mixture of other components, stainless steel baffles designed for the ½ gallon carton are inserted, and mixing is continued for 5 seconds. The carton is then lowered to allow the mixer to drain while observing the cream time, and the contents are quickly poured into the mold. The mold lid is closed, clamps are placed around the mold to prevent flashout, and the exit time is observed. The 4-inch mold is demolded after standing at room temperature for ten minutes. After trimming around the edges with scissors, the foam sample is weighed before running through rollers four times to crush cells open, and is then allowed to cure for 3 days at room temperature before being submitted for physical property measurements.

The results of examples in which the tertiary amine catalyst mixtures of this invention were utilized as the catalytic component of the foam-producing reaction mixture are given in Table IX below and comparisons made with other catalysts.

TABLE IX
EVALUATION OF TERTIARY AMINE CATALYST MIXTURES IN HIGH RESILIENCE POLYETHER POLYURETHANE FOAMS

| EXAMPLE | 91 | 92 | 93 | 94 | 95 | 96 | 97 | 98 | 99 | 100 | 101 | 102 | 103 |
|---|---|---|---|---|---|---|---|---|---|---|---|---|---|
| Polyether Polyol II, parts | 60 | 60 | 60 | 60 | 60 | 60 | 60 | 60 | 60 | 60 | 60 | 60 | 60 |
| Polymer/Polyol I, parts | 40 | 40 | 40 | 40 | 40 | 40 | 40 | 40 | 40 | 40 | 40 | 40 | 40 |
| Water, parts | 2.6 | 2.6 | 2.6 | 2.6 | 2.6 | 2.6 | 2.6 | 2.6 | 2.6 | 2.6 | 2.6 | 2.6 | 2.6 |
| Tertiary Amine Catalyst Mixture or Tertiary Amine Type | A | A | B | B | C | C | F | K | K | M | M | *NN | *NN |
| Tertiary Amine Catalyst Mixture or Tertiary Amine, parts | .30 | .50 | .30 | .50 | .30 | .50 | .30 | .40 | .80 | .50 | .80 | .30 | .80 |
| Catalyst II, parts | .015 | .015 | .015 | .015 | .015 | .015 | .015 | .015 | .015 | .015 | .015 | .015 | .015 |
| Catalyst III, parts | — | .05 | .10 | — | — | — | — | .10 | — | — | — | .07 | — |
| Catalyst IV, parts | .30 | .30 | .30 | .30 | .30 | .30 | .30 | .30 | .30 | .30 | .30 | .30 | .30 |
| Catalyst V, parts | .36 | .36 | .36 | .36 | .36 | .36 | .36 | .36 | .36 | .36 | .36 | .36 | .36 |
| Silicone Surfactant III, parts | 2.0 | 2.0 | 2.0 | 2.0 | 2.0 | 2.0 | 2.0 | 2.0 | 2.0 | 2.0 | 2.0 | 2.0 | 2.0 |
| Isocyanate II (Index 107), Parts | 34.4 | 34.4 | 34.4 | 34.4 | 34.4 | 34.4 | 34.4 | 34.4 | 34.4 | 34.4 | 34.4 | 34.4 | 34.4 |
| Exit Time, Seconds | 106 | 106 | 103 | 92 | 100 | 85 | 93 | 100 | 105 | 127 | 112 | 106 | 93 |
| Cream Time, Seconds | 5 | 5 | 9 | 6 | 6 | 5 | 5 | 5 | 6 | 15 | 13 | 7 | 5 |
| Porosity, SCFM | 28.5 | 25.2 | 22.7 | 34.7 | 26.2 | 28.5 | 22.5 | 25.7 | 29.2 | 23.7 | 28.9 | 33.1 | 37.2 |
| Comments | — | — | — | — | — | — | — | — | — | — | — | Coarse Cells | Coarse Cells |

*Outside the scope of this invention.

The data of Table IX demonstrates that Tertiary Amine Catalyst Mixtures A, B, C, F, K and M of this invention are catalytically effective in promoting the water-isocyanate reaction in high resilience polyether polyurethane foam formulations, as reflected by exit time and the highly porous nature of the foam products.

With the exception of Tertiary Amine Catalyst Mixture F in which sufficient data is not available to make a determination, the remaining Tertiary Amine Catalyst Mixtures A, B, C, K and M possess the further desirable property of wide processing latitude. This is evidenced from the available examples in which the tertiary amine catalyst mixtures, when employed in various concentration amounts of relatively wide processing latitude, produce high resilience polyether polyurethane foams having desirable physical properties including good formulation reactivity and good foam porosity or breathability. It was also observed that the freshly prepared high resilience polyether polyurethane foams of Examples 91 to 101 inclusive were nearly odorless and were essentially free of amine odor.

What is claimed is:

1. A catalyst mixture which comprises: (1) from about 5 to about 10 percent by weight of 2-hydroxyethyl piperazine; (2) from about 5 to about 10 percent by weight of 1,4-di-(2-hydroxyethyl) piperazine; and (3) from about 80 to about 90 percent by weight of 1,4-diazobicyclo [2.2.2] octane.

2. A catalyst mixture which comprises: (1) from about 10 to about 20 percent by weight of 2-hydroxyethyl piperazine; (2) from about 10 to about 20 percent by weight of 1,4-di-(2-hydroxyethyl) piperazine; and (3) from about 65 to about 75 percent by weight of N-ethyl morpholine.

* * * * *